Figure 1:
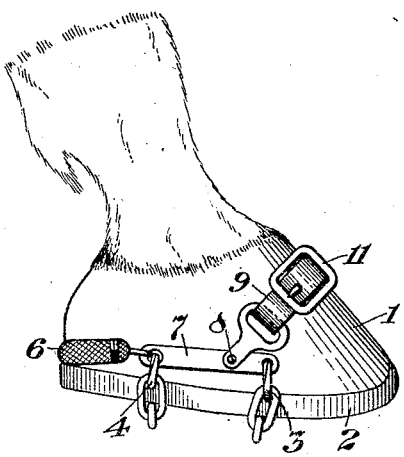

G. N. KINNELL.
OVERSHOE.
APPLICATION FILED MAR. 6, 1909. RENEWED OCT. 31, 1911.

1,010,386.

Patented Nov. 28, 1911.
4 SHEETS—SHEET 1.

Witnesses:

Inventor
George N. Kinnell
By his Attorney

G. N. KINNELL.
OVERSHOE.
APPLICATION FILED MAR. 6, 1909. RENEWED OCT. 31, 1911.

1,010,386.

Patented Nov. 28, 1911.

4 SHEETS—SHEET 2.

Witnesses:
Chas. F. Clagett

Inventor
George N. Kinnell
By his Attorney
George C. Mean

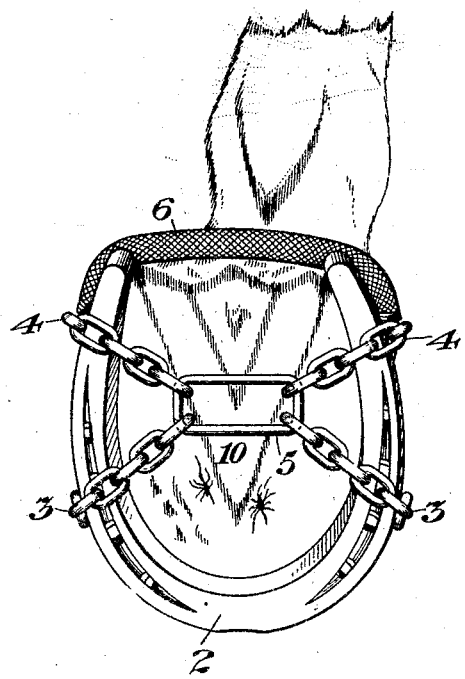

UNITED STATES PATENT OFFICE.

GEORGE N. KINNELL, OF PITTSFIELD, MASSACHUSETTS.

OVERSHOE.

1,010,386.　　　　　　Specification of Letters Patent.　　Patented Nov. 28, 1911.

Application filed March 6, 1909, Serial No. 481,830. Renewed October 31, 1911. Serial No. 657,721.

*To all whom it may concern:*

Be it known that I, GEORGE N. KINNELL, a citizen of the United States, and a resident of Pittsfield, in the county of Berkshire and State of Massachusetts, have invented certain new and useful Improvements in Overshoes, of which the following is a specification.

My present invention concerns detachable overshoes for various purposes, particularly applicable for use on horses and other hoofed animals for various purposes and particularly to prevent slipping.

In my prior application Serial No. 460,336, I have shown an overshoe consisting of interconnected diagonal strands or articulations adapted to serve as calks and suspended by a spreader and equalizing lever on each side of the foot, subject to upward and forward tension through a toe strap and to rearward tension through a heel member seated in the notches under the heels of the hoof and above the rearwardly projecting ends of the metallic shoe. The heel member may be of fine quality steel wire or chain, but I prefer heavy baling wire which does not stretch and is not very resilient, yet is flexible enough so that in use it fits itself to the surface upon which it bears and becomes bent or set so that there is practically no tendency for it to spring out of position. Various other novel features and functions of said overshoe are explained in said application. In other applications, I have described auxiliary means for supporting the heel member independently of engagement with the heels of the hoof. For present purposes, I have chosen to show the heel member as consisting of cushioned wire engaging the notches between the ordinary shoe and the heels of the hoof, after the manner set forth in said application Serial No. 460,336; also, the tread members are shown as consisting of strands or articulations in the form of short lengths of chain. These may be disposed across the cavity under the hoof in any desired way, though for most purposes I prefer the diagonal arrangement with an interconnecting central link, such as shown in the aforesaid application.

In all of the figures, the securing means on the overshoe includes a tension member extending diagonally over the toe of the hoof and adapted to oppose downward and rearward displacement, after the manner explained in said application.

The various features constituting my present invention will be evident from the following detailed description in connection with the accompanying drawings, in which—

Figure 7:
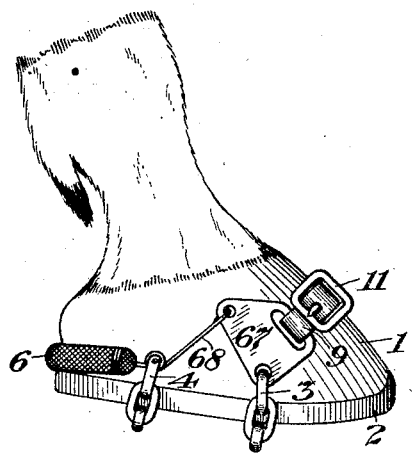
Figure 8:
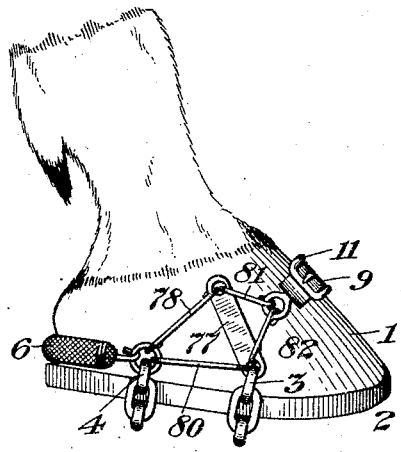
Figure 9:
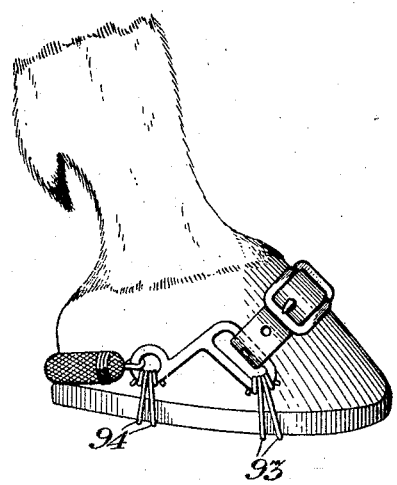
Figure 10:
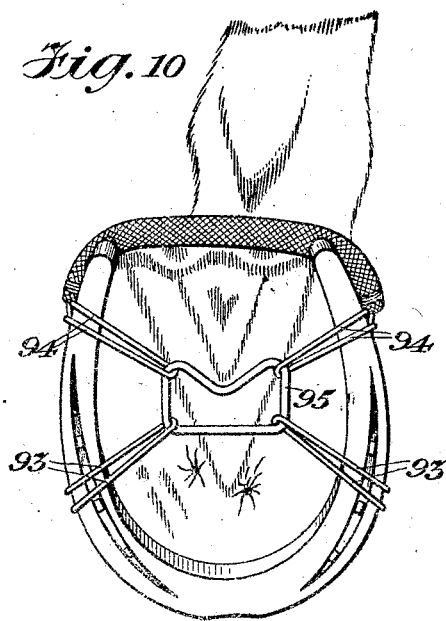

Figures 1 to 9 and 11 and 12 are side elevations each showing a horse's hoof with an overshoe embodying various features of my invention. Fig. 10 is a bottom view of a horse's hoof with an overshoe as shown in Fig. 9. Fig. 13 is a bottom view of a horse's hoof showing the interconnecting central link of an overshoe.

In all of the figures, the hoof 1 is provided with the metal shoe 2 of the ordinary type projecting slightly beyond the heels of the hoof. In all of the figures, the tread strands where chain treads are disclosed are connected to the securing means by end links 3, 4, and in each case the securing means comprises a band encircling the walls of the hoof, comprising a heel member 6 and a toe member or strap 9, adapted to be tightened in place by buckle 11, together with an intermediate connection 7 between the toe and heel members.

Referring particularly to Fig. 1, it will be seen that the member 7 acts as a spreader to maintain separation of the forward and rear tread chains and also as an equalizing lever to apply the upward resultant of the tension of the toe strap 9 to both the rear and the forward tread strands. Instead of being a bent lever, as in my prior application, it is a straight lever having the tension of the toe strap applied thereto through a pivotal connection at 8, the pivotal point being approximately in a straight line between the points of attachment of the flexible tread. The end links 3, 4, of the tread chains are split links, thereby facilitating removal and renewing of the tread chains when these may become worn or broken in use.

Figure 2:
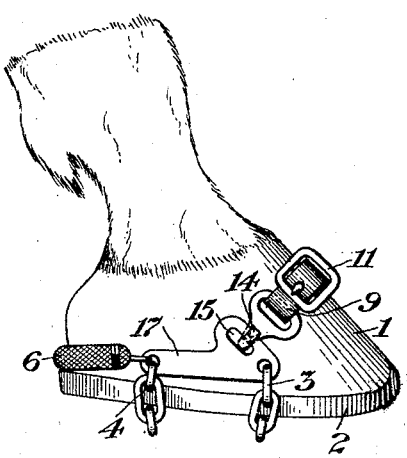

In Fig. 2 the intermediate member 17 is a combined spreader and equalizing lever. Mechanically considered, it is a bent lever, insomuch as the tension of the toe strap is applied at a point above a straight line between the points of connection of the tread. The toe strap is connected through a loop or hook 14 engaging a slot 15, extending approximately parallel with the front line of the toe, thereby permitting slight play and self-adjustment of the toe strap for different sizes and shapes of hoof, somewhat as in my prior application referred to.

In both Figs. 1 and 2, it will be noted that the line of tension of the heel member is almost directly rearward, thereby largely balancing the forward component of the pull of the diagonal toe strap, and thus leaving a large upward resultant to be applied to the forward and rear tread chains by the equalizing lever.

Figure 3:
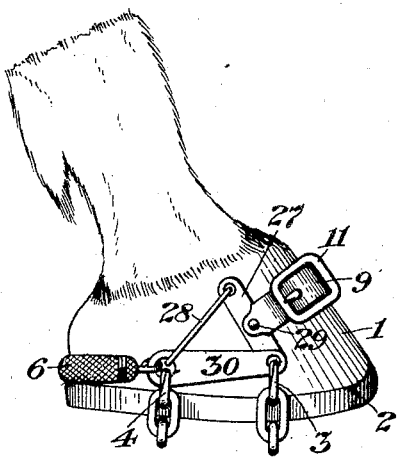
Figure 4:
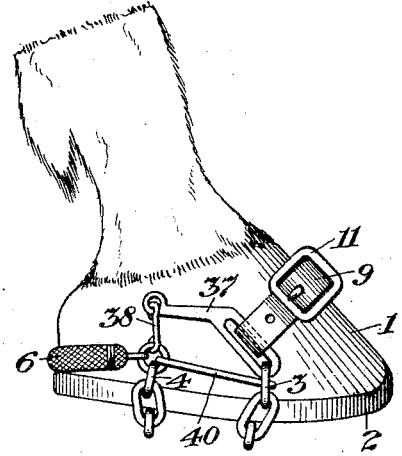

In Figs. 3 and 4, I have shown modifications whereby the functions of spreader and equalizing lever are separated and the portion of the pull of the equalizing lever applied to the rear tread member is applied from a point higher up on the hoof. In Fig. 3, the equalizing lever 27 is pivoted at the forward tread link 3, and extends up the surface of the hoof along the approximately straight line elements thereof. The free upper end of the lever exerts tension on the rear link 4 at a high angle upward through the intermediate tension member 28. The pull of the toe strap is applied through a pivotal connection 29 intermediate points of connection of 3 and 28. In this case, a spreader is not absolutely necessary as the forward component of the pull of the equalizing lever on 3 tends to keep the forward tread chains in a forward position and the heel member 6 tends to keep the rear tread member in the rearward position. As shown, however, the spreader 30 is provided, which is preferably sufficiently rigid to form a thrust member adapted to maintain separation of the tread strands against either thrust or tension.

Fig. 4 is a modified embodiment of a principle illustrated in Fig. 3. The equalizing lever 37 is provided with a loop for sliding, adjusting engagement with the toe strap above the point of interlinkage with the forward chain 3. The free end of the lever 37 is extended to a point above the rear tread link 4 and applies upward stress thereto through an intermediate member 38. In this case, a tension connection 40 is provided between links 3 and 4 to serve as a tension spreader to limit the distance of separation under pull of the toe strap.

Figure 5:
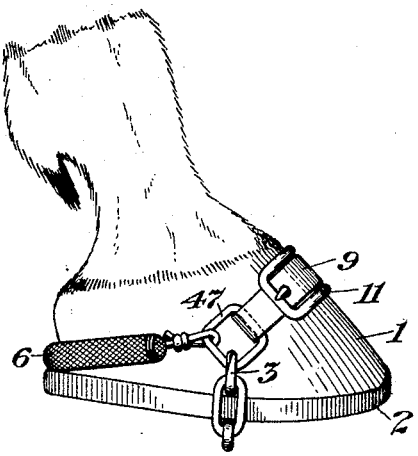

Fig. 5 shows a simplified form in which a single tread chain 3 is used, preferably extending diametrically across the cavity under the hoof at a point sufficiently far from the toe to prevent danger of displacement over the toe. In this case, lever and spreader functions are not necessary and the heel, toe, and tread members are connected by link 47. In this case, the lengths of the three members are so proportioned that the pull of the heel member will be considerably more nearly horizontal than the pull of the toe strap, thus balancing the forward component of the pull of the toe strap and leaving an upward component sufficient for support of the tread strand.

Figure 6:
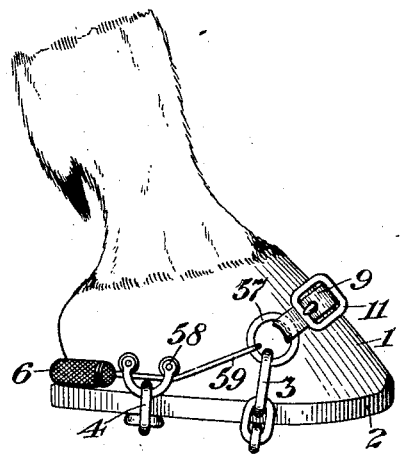

In Fig. 6, two tread members are used, as in Figs. 1 to 4. The spreader function is accomplished by causing the rear tread connection 4 to have a sliding engagement with the heel member 6, as at 58, and proportioning the lengths of the members so that the rear tread connection holds down the heel member to a position where its primary pull is nearly horizontal, while the connecting portion 59, in advance of the sliding engagement at 58, inclines upwardly at a greater angle. In this case, there is practically no lever effect, the upward tension through link 57 being divided between the forward and rear tread links 3, 4, in proportion to the effectiveness of the several angles of stress of the system 6, 4, 59, 9 and the system represented by 59, 3, 9, in giving upward resultants from 9 on their respective tread connections 4 and 3.

Fig. 7 is similar to Fig. 6, insomuch as the heel member is held down by a sliding connection of the rear link 4 but the upward angle of the extension 68 of the heel member is greatly increased by the use of the equalizing lever 67, which divides the tension of the toe strap between the forward tread link 3 and the said extension 68. In said Fig. 7, there is no separate spreader, the spreader function being effected by the difference in direction of pull of 6 and 68 upon sliding member 4, which operates to maintain 4 in the rearward position, while the positive pull of the toe strap maintains the forward link 3 in the forward position.

In Fig. 8, I have combined and modified certain features shown in Figs. 3 and 4. In this case, the equalizing lever 77 extends in approximately the same general direction as the lever 27, in Fig. 3. It is connected to the rear tread link 4 by a tension member 78, similar to 28. The spreader is a tension spreader 80, adapted to limit the possible distance of separation of the forward and rear tread links. The toe strap is connected to the equalizing lever by tension members 81, 82, instead of by a pivot, as in Fig. 3, or a loop, as in Fig. 4.

Figs. 9, 10, 11, and 12 show flexible yielding tread strands adapted to serve as calks, but which are not articulated after the manner of the chain links shown in the preceding figures.

In Fig. 9, the securing means may be and preferably is in all respects similar to that shown in my prior application Serial No. 460,336. The tread strands, however, consist of fine quality steel wire, such as large size piano wire. In the said figure, the strands may be composed of one or more lengths of the wire, as indicated at 93, 93, 94, 94. The wires are not likely to injure the frog, and hence may be extended either directly or diagonally across the frog, though I prefer to provide a central spacing link 95, as shown in Fig. 10. In said figure, the rear side of the link is bent forwardly so as to cross the central region of the frog nearer the point thereof.

Figure 11:
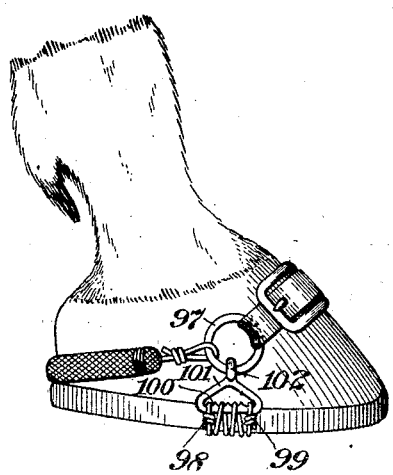
Figure 12:
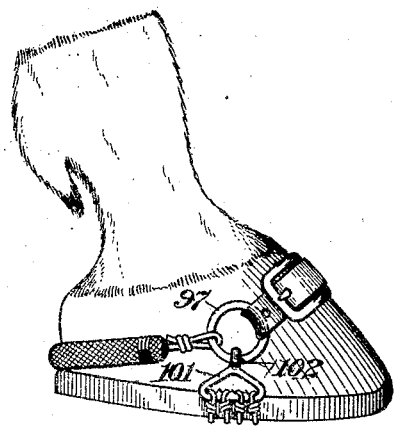

Figs. 11 and 12 show a securing means somewhat similar to that shown in Fig. 5. The tread, however, is composed of a plurality of wires extending diametrically across the tread. In Fig. 11, the wire is shown as one continuous length secured at one end 98 to the stirrup 101, and threaded back and forth across the tread around a similar stirrup on the side of the hoof and secured at the other end 99 to said first mentioned stirrup. Fig. 12 differs from Fig. 11 in that each wire is separately secured. In both figures, the wires are disposed in recesses 100, adapted to maintain separation thereof. They are suspended from the link 97 by means of the stirrup 101, preferably by means of a hook 102. The latter is preferably of malleable metal to facilitate renewal of the tread portion when the wire of the same becomes broken. The old tread may be removed by breaking or bending open the hook 102, and the new tread may be applied by hooking the stirrup to the link and closing the hook by a blow of the hammer. It will be obvious that these terminal hooks for renewing treads of non-slip overshoes may be applied to any form of tread. For instance, they may be used in place of the split links 3, 4, shown in Figs. 1 and 2.

In Fig. 13, is shown a bottom view of a horse's hoof with an overshoe as shown in Figs. 1, 2, 3, 4, 6, 7, and 8, provided with an interconnecting central link of the form shown in my application 460,336, designed to prevent possible injury of the frog by the chain tread strands.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. An overshoe comprising an articulated strand adapted to serve as a calk beneath the tread of the hoof, in combination with securing means therefor comprising a toe member passing diagonally over the toe and adapted to afford upward and forward tension, and a member passing around the heel of the hoof and adapted to afford tension in a direction more nearly horizontal than the direction of tension of said toe member.

2. An overshoe comprising an articulated strand adapted to serve as a calk beneath the tread of the hoof, in combination with securing means therefor comprising a toe member passing diagonally over the toe and adapted to afford upward and forward tension, and a member passing around the heel of the hoof and adapted to afford tension in a direction more nearly horizontal than the direction of tension of said toe member, the desired directions of tension of the several members being predetermined by the lengths of the respective members.

3. In a device of the class described, flexible tread connections and securing means comprising a diagonally arranged toe member, a rearwardly extending heel member and a straight horizontal equalizing lever extending between the forward tread connection and the rear tread connection and connected to the toe strap so that the tension of the latter is applied to said equalizing lever at a point intermediate its ends.

4. As an article of manufacture, a flexible tread for overshoes comprising short lengths of chain and a central flat member adapted to span the frog of the hoof provided with suitable securing terminals, said parts being proportioned and arranged to extend across the tread and to fit corresponding engaging portions of suitable securing means extending about the sides of the foot.

5. As an article of manufacture, a flexible tread for overshoes comprising short lengths of chain and a central flat link adapted to span the frog of the hoof provided with suitable securing terminals, said parts being proportioned and arranged to extend across the tread and to fit corresponding engaging portions of suitable securing means extending about the side of the foot.

6. As an article of manufacture, a flexible tread for overshoes comprising marginal flexibly connected articulations and a central member adapted to span the frog of the hoof provided with suitable securing terminals, said parts being proportioned and arranged to extend across the tread and to fit corresponding engaging portions of suitable securing means extending about the sides of the foot.

7. As an article of manufacture, a flexible tread for overshoes comprising marginal flexibly connected articulations and a central link adapted to span the frog of the hoof provided with suitable securing terminals, said parts being proportioned and arranged to extend across the tread and to fit corresponding engaging portions of suitable securing means extending about the sides of the foot.

Signed at New York city in the county of New York and State of New York this third day of March A. D. 1909.

GEORGE N. KINNELL.

Witnesses:
GEORGE C. DEAN,
IRVING M. OBRIEGHT.